(12) United States Patent
McClung

(10) Patent No.: US 9,022,888 B2
(45) Date of Patent: *May 5, 2015

(54) ANGLE IMPACT TOOL

(71) Applicant: Ingersoll-Rand Company, Davidson, NC (US)

(72) Inventor: Mark T. McClung, Andover, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/796,407

(22) Filed: Mar. 12, 2013

(65) Prior Publication Data

US 2014/0274526 A1    Sep. 18, 2014

(51) Int. Cl.
*F16H 37/04* (2006.01)
*B25B 21/02* (2006.01)

(52) U.S. Cl.
CPC .............. *F16H 37/041* (2013.01); *B25B 21/02* (2013.01); *B25B 21/026* (2013.01)

(58) Field of Classification Search
CPC ................................ F16H 37/04; F16H 37/041
See application file for complete search history.

(56) References Cited

U.S. PATENT DOCUMENTS

| | | |
|---|---|---|
| 2,267,781 A | 12/1941 | Albertson |
| 2,585,486 A | 2/1952 | Mitchell |
| 3,181,672 A | 5/1965 | Swanson |
| 3,223,182 A | 12/1965 | Mikiya |
| 3,270,593 A | 9/1966 | Kaman |
| 3,352,368 A | 11/1967 | Maffey, Jr. |
| 3,380,539 A | 4/1968 | Kaman |
| 3,465,646 A | 9/1969 | Kiester et al. |
| 3,661,217 A | 5/1972 | Maurer |
| 3,848,680 A | 11/1974 | Legler |
| 3,949,944 A | 4/1976 | Bent |
| 3,951,217 A | 4/1976 | Wallace et al. |
| 4,173,828 A | 11/1979 | Lustig et al. |
| D256,980 S | 9/1980 | Adams et al. |
| 4,222,443 A | 9/1980 | Chromy |
| 4,235,850 A | 11/1980 | Otto, Jr. |
| 4,287,795 A | 9/1981 | Curtiss |
| 4,355,564 A | 10/1982 | Gidlund |
| 4,379,492 A | 4/1983 | Hiraoka |

(Continued)

FOREIGN PATENT DOCUMENTS

| | | |
|---|---|---|
| CN | 1318451 A | 10/2001 |
| CN | 1494988 A | 5/2004 |

(Continued)

OTHER PUBLICATIONS

Ingersoll Rand Company, "2015MAX and 2025MAX Series Angle Air Impactool-Exploded View", May 2010, 2 pages.

(Continued)

*Primary Examiner* — Huan Le
(74) *Attorney, Agent, or Firm* — Barnes & Thornburg LLP

(57) ABSTRACT

Illustrative embodiments of angle impact tools are disclosed. In at least one illustrative embodiment, an angle impact tool may comprise a motor including an output shaft configured to rotate about a first axis, an impact mechanism configured to drive rotation of an output drive about a second axis that is non-parallel to the first axis, and a gear assembly configured to be driven by the output shaft of the motor and to drive the impact mechanism, the gear assembly comprising a planetary gear set coupled to the output shaft of the motor.

20 Claims, 13 Drawing Sheets

(56) References Cited

U.S. PATENT DOCUMENTS

| | | |
|---|---|---|
| 4,403,679 A | 9/1983 | Snider |
| 4,434,858 A | 3/1984 | Whitehouse |
| 4,488,604 A | 12/1984 | Whitehouse |
| 4,585,078 A | 4/1986 | Alexandrov et al. |
| 4,625,999 A | 12/1986 | Valentine et al. |
| 4,708,210 A | 11/1987 | Rahm |
| 4,719,976 A | 1/1988 | Bleicher et al. |
| 4,732,218 A | 3/1988 | Neumaier et al. |
| 4,735,020 A | 4/1988 | Schulz et al. |
| 4,740,144 A | 4/1988 | Biek |
| 4,776,561 A | 10/1988 | Braunlich et al. |
| 4,779,382 A | 10/1988 | Rudolf et al. |
| 4,798,249 A | 1/1989 | Hoereth et al. |
| 4,799,833 A | 1/1989 | Pennison et al. |
| 4,867,250 A | 9/1989 | Ono |
| 4,974,475 A | 12/1990 | Lord et al. |
| 5,022,469 A | 6/1991 | Westerberg |
| D323,961 S | 2/1992 | Fushiya et al. |
| 5,143,161 A | 9/1992 | Vindez |
| D335,808 S | 5/1993 | Bruno et al. |
| 5,210,918 A | 5/1993 | Wozniak et al. |
| D339,726 S | 9/1993 | Bruno et al. |
| 5,293,747 A | 3/1994 | Geiger |
| 5,346,021 A | 9/1994 | Braunlich |
| 5,346,024 A | 9/1994 | Geiger et al. |
| D352,645 S | 11/1994 | Ichikawa |
| 5,443,196 A | 8/1995 | Burlington |
| 5,471,898 A | 12/1995 | Forman |
| 5,505,676 A | 4/1996 | Bookshar |
| D372,850 S | 8/1996 | Dubuque et al. |
| 5,626,198 A | 5/1997 | Peterson |
| D380,949 S | 7/1997 | Sung |
| D388,678 S | 1/1998 | Bantly et al. |
| D393,580 S | 4/1998 | Bantly et al. |
| 5,813,477 A | 9/1998 | Clay et al. |
| D400,771 S | 11/1998 | Smith et al. |
| D403,564 S | 1/1999 | Izumisawa |
| 5,906,244 A | 5/1999 | Thompson et al. |
| D414,093 S | 9/1999 | Zurwelle |
| 6,039,231 A | 3/2000 | White |
| 6,044,917 A | 4/2000 | Brunhoelzl |
| 6,047,779 A | 4/2000 | Wallace |
| 6,053,080 A | 4/2000 | Kaneyama et al. |
| 6,082,468 A | 7/2000 | Pusateri et al. |
| 6,109,366 A | 8/2000 | Jansson et al. |
| D434,297 S | 11/2000 | Iritani et al. |
| D434,958 S | 12/2000 | Izumisawa |
| 6,158,459 A | 12/2000 | Chang |
| D436,818 S | 1/2001 | Izumisawa |
| 6,179,063 B1 | 1/2001 | Borries et al. |
| D437,760 S | 2/2001 | Izumisawa |
| D441,628 S | 5/2001 | Bass et al. |
| 6,250,399 B1 | 6/2001 | Giardino |
| D444,363 S | 7/2001 | Hayakawa et al. |
| D447,029 S | 8/2001 | Sun et al. |
| 6,338,389 B1 | 1/2002 | Chang |
| D454,475 S | 3/2002 | Taga |
| D458,824 S | 6/2002 | Chen |
| D461,110 S | 8/2002 | Izumisawa |
| 6,460,629 B2 | 10/2002 | Bookshar et al. |
| 6,461,088 B2 | 10/2002 | Potter et al. |
| D465,982 S | 11/2002 | Taga |
| 6,491,111 B1 | 12/2002 | Livingston et al. |
| 6,502,485 B1 | 1/2003 | Salazar |
| 6,505,690 B2 | 1/2003 | Tokunaga |
| D469,673 S | 2/2003 | Silker et al. |
| D472,782 S | 4/2003 | Pusateri et al. |
| 6,561,284 B2 | 5/2003 | Taga |
| D476,210 S | 6/2003 | Chen |
| D476,870 S | 7/2003 | Hayakawa et al. |
| D477,512 S | 7/2003 | Liu et al. |
| 6,691,798 B1 | 2/2004 | Lindsay |
| 6,708,779 B2 | 3/2004 | Taga |
| 6,719,067 B2 | 4/2004 | Taga |
| 6,782,956 B1 | 8/2004 | Seith et al. |
| D496,243 S | 9/2004 | Huang |
| 6,789,447 B1 | 9/2004 | Zinck |
| 6,796,385 B1 | 9/2004 | Cobzaru et al. |
| D497,529 S | 10/2004 | Price |
| D497,785 S | 11/2004 | Izumisawa |
| D497,787 S | 11/2004 | Liao |
| D502,071 S | 2/2005 | Snider |
| 6,863,134 B2 | 3/2005 | Seith et al. |
| 6,863,135 B2 | 3/2005 | Kamimura et al. |
| 6,880,645 B2 | 4/2005 | Izumisawa |
| 6,883,619 B1 | 4/2005 | Huang |
| 6,889,778 B2 | 5/2005 | Colangelo, III et al. |
| 6,929,074 B1 | 8/2005 | Lai |
| 6,935,437 B2 | 8/2005 | Izumisawa |
| D510,513 S | 10/2005 | Aglassinger |
| 6,957,706 B2 | 10/2005 | Burger et al. |
| D511,284 S | 11/2005 | Henssler et al. |
| 6,968,908 B2 | 11/2005 | Tokunaga et al. |
| D519,807 S | 5/2006 | Chen |
| D521,339 S | 5/2006 | Chen |
| 7,036,605 B2 | 5/2006 | Suzuki et al. |
| 7,036,795 B2 | 5/2006 | Izumisawa |
| 7,040,414 B1 | 5/2006 | Kuo |
| D525,502 S | 7/2006 | Chen |
| 7,080,578 B2 | 7/2006 | Izumisawa |
| 7,089,833 B2 | 8/2006 | Hamann et al. |
| 7,109,675 B2 | 9/2006 | Matsunaga et al. |
| D529,353 S | 10/2006 | Wong et al. |
| D530,171 S | 10/2006 | Baker |
| 7,137,457 B2 | 11/2006 | Frauhammer et al. |
| 7,140,179 B2 | 11/2006 | Bass et al. |
| D534,047 S | 12/2006 | Chi |
| D535,536 S | 1/2007 | Ghode et al. |
| 7,174,971 B1 | 2/2007 | Chen |
| 7,191,849 B2 | 3/2007 | Chen |
| D540,134 S | 4/2007 | Clay |
| D540,640 S | 4/2007 | Clay |
| 7,311,155 B2 | 12/2007 | Chang |
| D569,206 S | 5/2008 | Takahagi et al. |
| D572,991 S | 7/2008 | Chen |
| D580,248 S | 11/2008 | Rane et al. |
| 7,461,704 B2 | 12/2008 | Chen |
| D587,080 S | 2/2009 | Rane et al. |
| 7,492,125 B2 | 2/2009 | Serdynski et al. |
| D590,226 S | 4/2009 | Chu |
| D590,680 S | 4/2009 | Cole et al. |
| D590,681 S | 4/2009 | Palermo et al. |
| D591,127 S | 4/2009 | Taga |
| 7,537,064 B2 | 5/2009 | Milbourne et al. |
| D610,888 S | 3/2010 | Izumisawa et al. |
| D617,620 S | 6/2010 | Yaschur et al. |
| 7,770,660 B2 | 8/2010 | Schroeder et al. |
| 7,779,931 B2 | 8/2010 | Townsan |
| D624,380 S | 9/2010 | Rane et al. |
| 7,828,072 B2 | 11/2010 | Hashimoto et al. |
| 7,836,797 B2 | 11/2010 | Hecht et al. |
| 7,886,840 B2 | 2/2011 | Young et al. |
| 8,267,192 B2 | 9/2012 | Lopano et al. |
| 8,297,373 B2 | 10/2012 | Elger et al. |
| 8,319,379 B2 | 11/2012 | Onose et al. |
| 8,347,979 B2 | 1/2013 | Young et al. |
| 8,925,646 B2 | 1/2015 | Seith |
| 2002/0035890 A1 | 3/2002 | Kusachi et al. |
| 2003/0075348 A1 | 4/2003 | Eardley et al. |
| 2004/0014411 A1 | 1/2004 | Jonas |
| 2004/0177980 A1 | 9/2004 | Lucas |
| 2005/0161243 A1 | 7/2005 | Livingston et al. |
| 2005/0279196 A1 | 12/2005 | Hollar |
| 2005/0279519 A1 | 12/2005 | Clark |
| 2006/0090914 A1 | 5/2006 | Lin et al. |
| 2006/0107798 A1 | 5/2006 | Falzone |
| 2007/0000674 A1 | 1/2007 | Sell et al. |
| 2007/0181322 A1 | 8/2007 | Hansson et al. |
| 2007/0282344 A1* | 12/2007 | Yedlicka et al. ............. 606/80 |
| 2007/0289760 A1 | 12/2007 | Sterling et al. |
| 2008/0066937 A1 | 3/2008 | Kobayashi |
| 2008/0289843 A1 | 11/2008 | Townsan |
| 2009/0038816 A1 | 2/2009 | Johnson et al. |
| 2009/0272554 A1 | 11/2009 | Young et al. |

(56) References Cited

U.S. PATENT DOCUMENTS

| | | | |
|---|---|---|---|
| 2009/0272556 A1 | 11/2009 | Young et al. | |
| 2010/0107423 A1 | 5/2010 | Bodine et al. | |
| 2010/0276168 A1 | 11/2010 | Murthy et al. | |
| 2011/0139474 A1 | 6/2011 | Seith et al. | |
| 2011/0233257 A1 | 9/2011 | Fukinuki et al. | |
| 2012/0118596 A1* | 5/2012 | Scott ............................... | 173/98 |
| 2012/0138329 A1 | 6/2012 | Sun et al. | |
| 2012/0152580 A1 | 6/2012 | Mattson et al. | |
| 2012/0211249 A1 | 8/2012 | Seith et al. | |
| 2013/0025900 A1 | 1/2013 | Kokinelis et al. | |
| 2014/0008090 A1 | 1/2014 | Kokinelis et al. | |
| 2014/0014385 A1 | 1/2014 | Kosugi et al. | |
| 2014/0216775 A1 | 8/2014 | Seith | |
| 2014/0216776 A1 | 8/2014 | Seith | |
| 2014/0262396 A1* | 9/2014 | McClung ....................... | 173/93 |

FOREIGN PATENT DOCUMENTS

| | | |
|---|---|---|
| EP | 2 277 469 A2 | 5/2005 |
| EP | 2174754 A1 | 4/2010 |
| JP | 3248296 B2 | 10/1994 |
| JP | 0911140 A | 1/1997 |
| JP | 3372398 B2 | 1/1997 |
| JP | 2001198853 A | 7/2011 |
| WO | 99/49553 A1 | 9/1999 |
| WO | 2011002855 A1 | 1/2011 |
| WO | 2011/111850 A1 | 9/2011 |
| WO | 2012/115921 A2 | 8/2012 |

OTHER PUBLICATIONS

Makita U.S.A., Inc., "18V LXTLithium-Ion Cordless 3/8" Angle Impact Wrench, Model BTL063Z: Parts Breakdown", Jul. 2007, 1 page.

International Preliminary Examining Authority, International Preliminary Report on Patentability for PCT/US2012/25850, mailed on Sep. 13, 2013, 27 pages.

State Intellectual Property Office of the People's Republic of China, First Office Action for CN200810188483.7, Dec. 25, 2012 (10 pages including English translation).

United States Patent & Trademark Office, Office Action for U.S. Appl. No. 13/033,217, mailed Jan. 4, 2013, 12 pages.

International Searching Authority, International Search Report and Written Opinion for PCT/US2012/25850, mailed on Dec. 26, 2012, 8 pages.

Photographs of pneumatic tools, published prior to Apr. 18, 2006, 5 pages.

Stanley Air Tools Valve, published prior to May 5, 2008, 3 pages.

Hitachi Power Tools, "Electric Tool Parts List, Cordless Angle Impact Driver, Model WH 10DCL," Aug. 29, 2008, 20 pages.

Makita Corporation, "Cordless Angle Impact Drivers, Model 6940D, 6940DW," publicly available at least as early as Sep. 28, 2010, 27 pages.

Sears Brands Management Corporation, "Operator's Manual, Craftsman Nextec, 12.0-Volt Lithium-Ion Cordless Right-Angle Impact Driver, Model No. 320.17562," 15 pages.

* cited by examiner

ANGLE IMPACT TOOL

TECHNICAL FIELD

The present disclosure relates, generally, to angle impact tools and, more particularly, to angle impact tools including a planetary gear set.

SUMMARY

According to one aspect, an angle impact tool may comprise a motor including an output shaft configured to rotate about a first axis, an impact mechanism configured to drive rotation of an output drive about a second axis that is non-parallel to the first axis, and a gear assembly configured to be driven by the output shaft of the motor and to drive the impact mechanism, the gear assembly comprising a planetary gear set coupled to the output shaft of the motor.

In some embodiments, the gear assembly may further comprise a bevel gear set coupled to the planetary gear set, the bevel gear set configured to be driven by the planetary gear set, and a spur gear set coupled to the bevel gear set and to the impact mechanism, the spur gear set configured to be driven by the bevel gear set and to drive the impact mechanism. In some embodiments, the spur gear set may not include an idler gear. The spur gear set may include only two gears. The bevel gear set may comprise a first bevel gear and a second bevel gear that meshes with the first bevel gear. The first bevel gear may be configured to rotate about the first axis, and the second bevel gear may be configured to rotate about a third axis that is parallel to and spaced apart from the second axis. The spur gear set may comprises a first spur gear configured to rotate about the third axis and a second spur gear configured to rotate about the second axis. The first spur gear may mesh with the second spur gear. The second bevel gear and the first spur gear may be integrally formed as a single gear.

In some embodiments, the impact mechanism may comprise an anvil configured to rotate about the second axis and a hammer configured to rotate about the second axis to periodically deliver an impact load to the anvil. The output drive may be coupled to the anvil of the impact mechanism. The output drive may be integrally formed with the anvil of the impact mechanism. The gear assembly may comprise a drive gear coupled to the hammer of the impact mechanism. The angle impact tool may further comprise a conical spring positioned between the hammer and the drive gear, the conical spring biasing the hammer away from the drive gear. The conical spring may have a first end coupled to the drive gear and a second end coupled to the hammer, the first end having a first diameter and the second end having a second diameter that is greater than the first diameter.

In some embodiments, the second axis may be perpendicular to the first axis. The impact mechanism may comprise a ball-and-cam-type impact mechanism. The motor may be an electric motor. The angle impact tool may further comprise a battery configured to supply electrical power to the electric motor.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
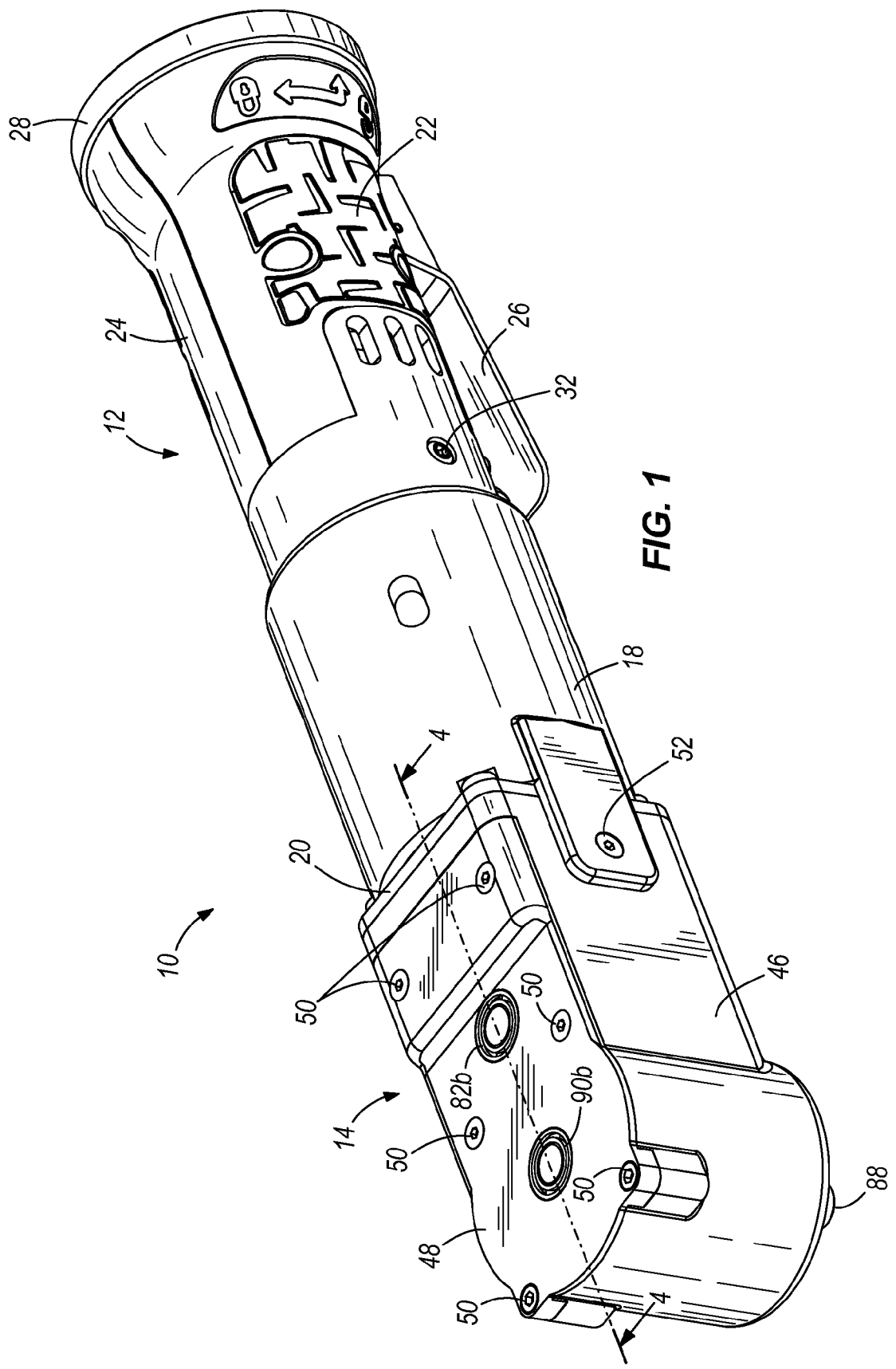
FIG. 1 is a perspective view of one illustrative embodiment an angle impact tool.
Figure 2:
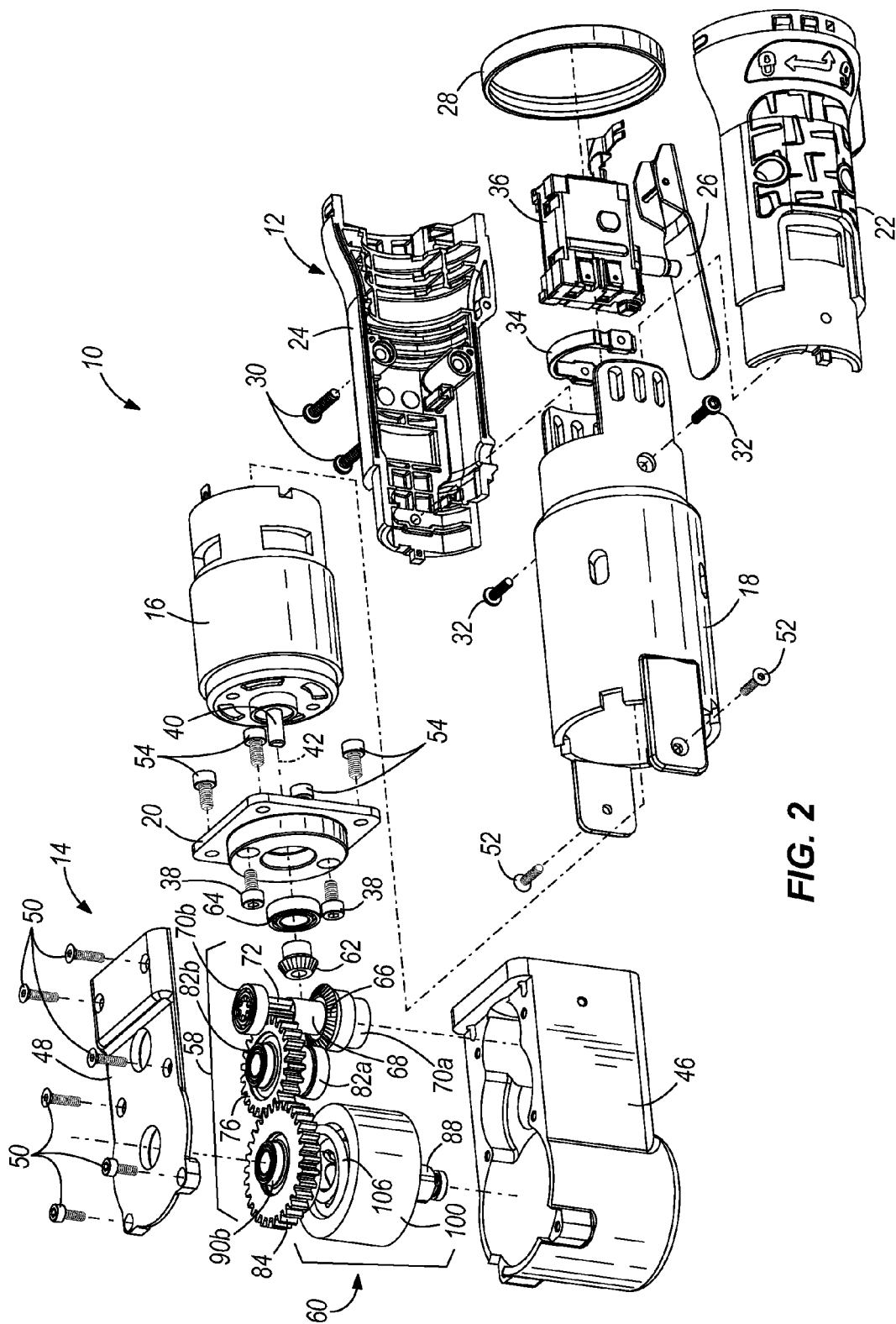
FIG. 2 is an exploded view of the angle impact tool of FIG. 1.
Figure 3:
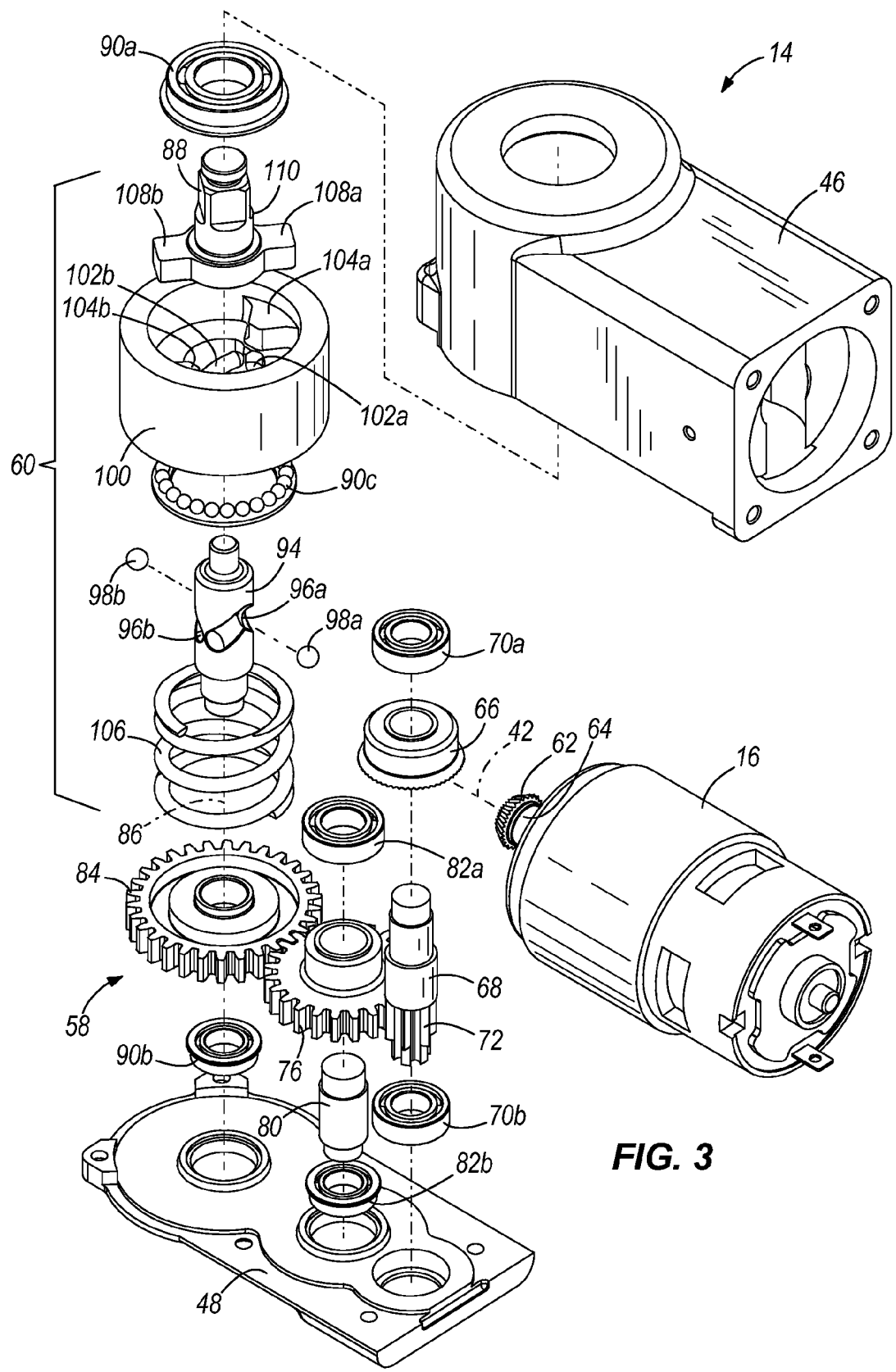
FIG. 3 is an exploded view of an angle head of the angle impact tool of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure. Unless otherwise specified, the terms "coupled," "mounted," "connected," "supported," and variations thereof are used broadly and encompass both direct and indirect couplings, mountings, connections, and supports.

Referring now to FIGS. 1-4, one illustrative embodiment of an angle impact tool 10 that includes a motor assembly 12 and a work attachment 14 is shown. The illustrated motor assembly 12 includes a motor 16, a motor housing 18, a motor bracket 20, a grip portion 22, a grip portion 24, a trigger lever 26, and a lock ring 28. The lock ring 28 and a plurality of fasteners 30 retain the two grip portions 22, 24 together. The motor housing 18 is coupled to the grip portions 22, 24 by a plurality of fasteners 32 and a U-shaped part 34. A switch 36 is included in the motor assembly 12 between the grip portions 22, 24. The switch 36 is coupled (mechanically and/or electrically) to the trigger lever 26, such that actuation of the trigger lever 26 causes actuation of the switch 36 and, therefore, operation of the motor 16.

The motor bracket 20 is coupled to the motor 16 by a plurality of fasteners 38. The motor 16 includes an output shaft, such as the illustrated rotor 40, that is rotatable about a longitudinal handle axis 42. The illustrated motor 16 is an electric motor, but any suitable prime mover, such as the pneumatic motor disclosed in U.S. Pat. No. 7,886,840, may be utilized. Although not shown in FIGS. 1-4, a battery and a directional reverse switch may be provided on the angle impact tool 10, in some embodiments.

The illustrated work attachment 14 includes an angle housing 46 and an angle housing plate 48. A plurality of fasteners 50 couple the angle housing plate 48 to the angle housing 46. The motor housing 18 is coupled to the angle housing 46 with a plurality of fasteners 52. The motor bracket 20 is coupled to the angle housing 46 by a plurality of fasteners 54.

Figure 4:
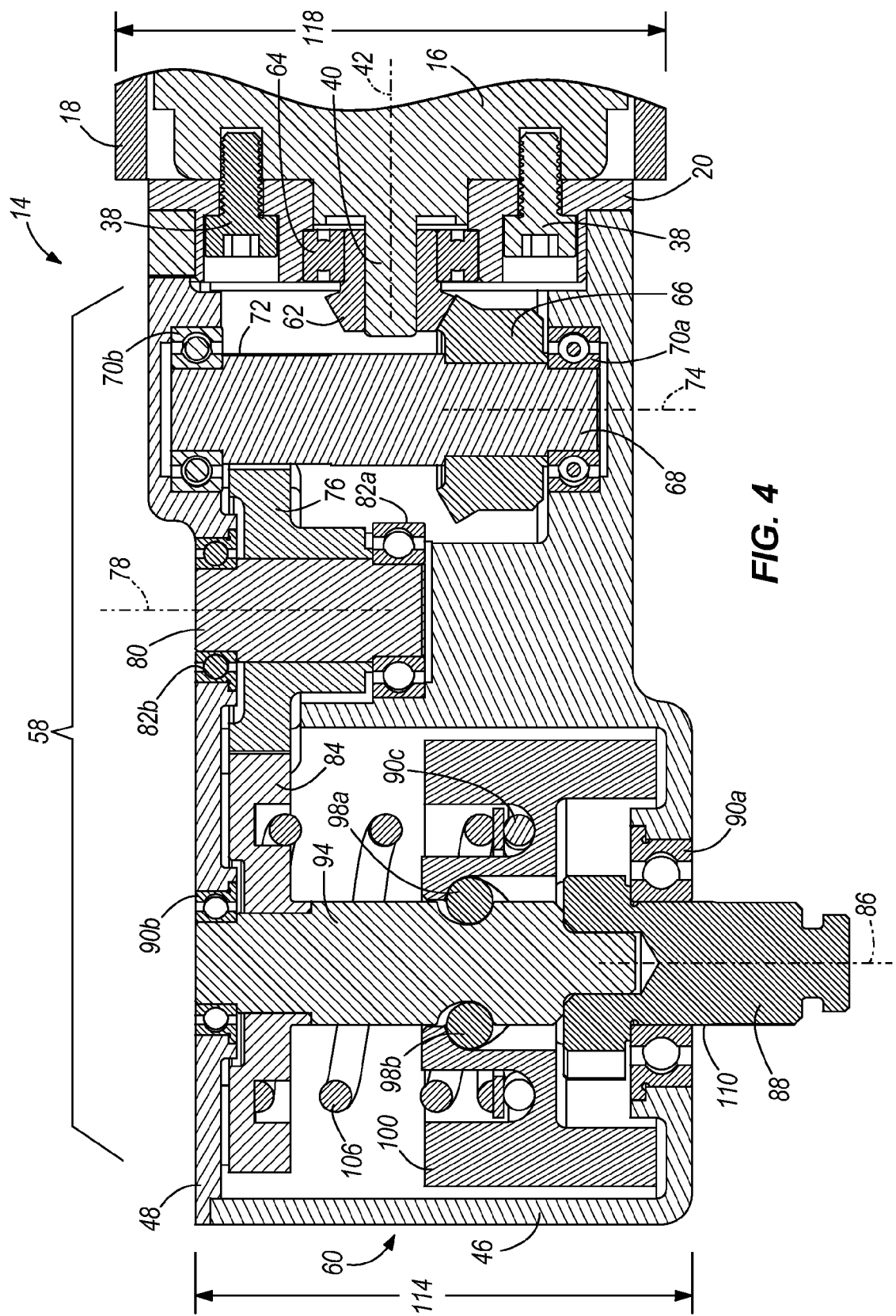
FIG. 4 is a cross-sectional view taken along line 4-4 of FIG. 1.
Figure 5A:
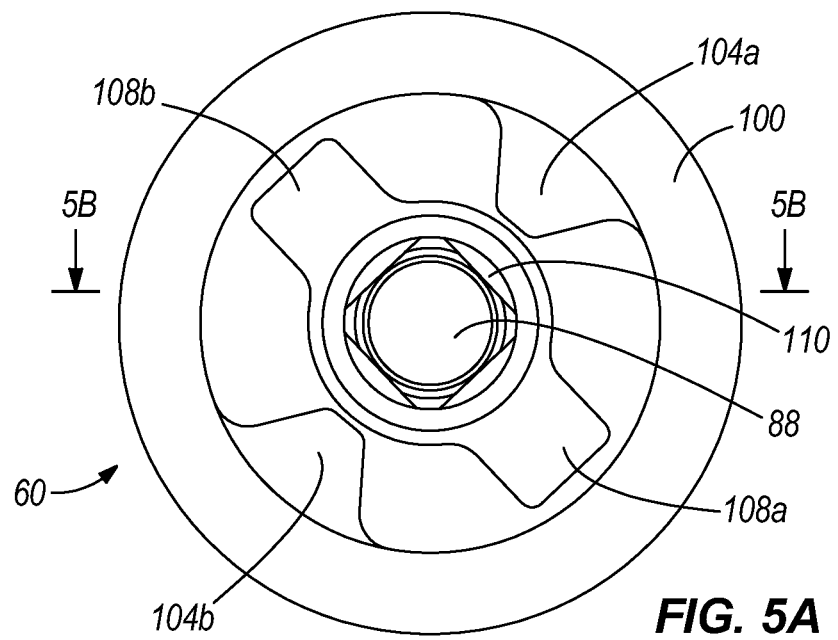
FIGS. 5A-5J illustrate an impact cycle of the angle impact tool of FIGS. 1-4.
Figure 5B:
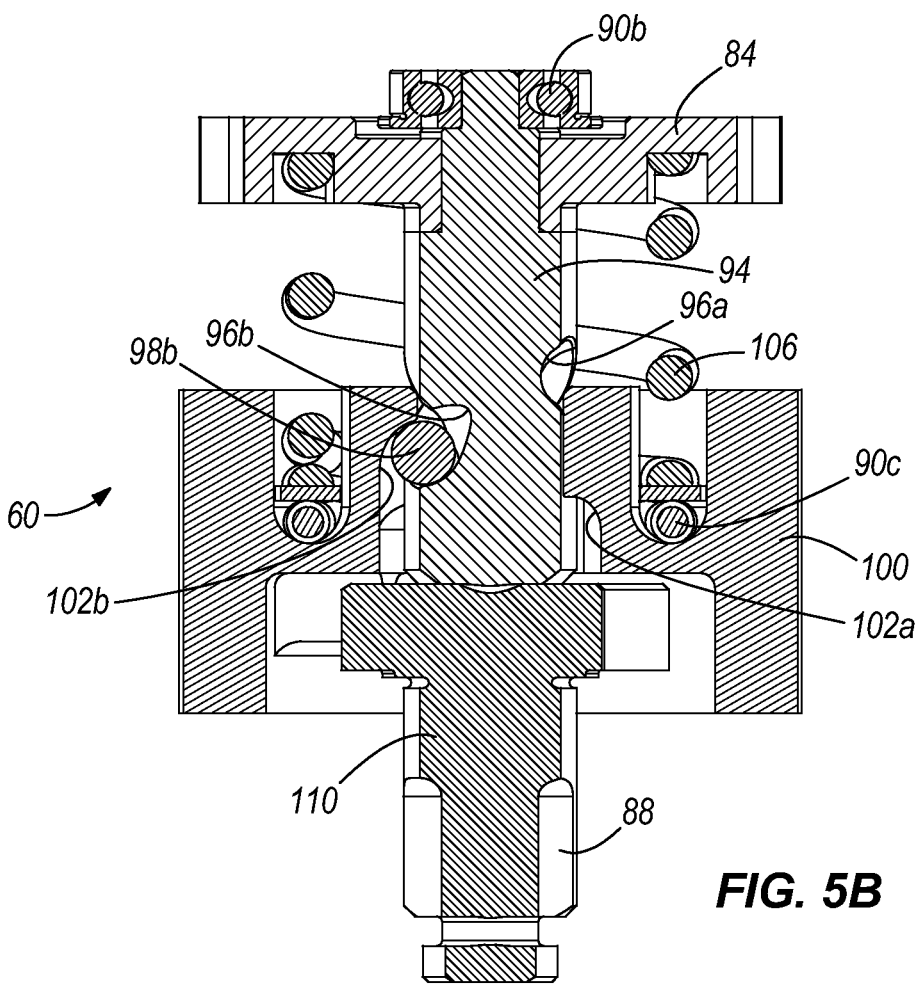
Figure 5C:
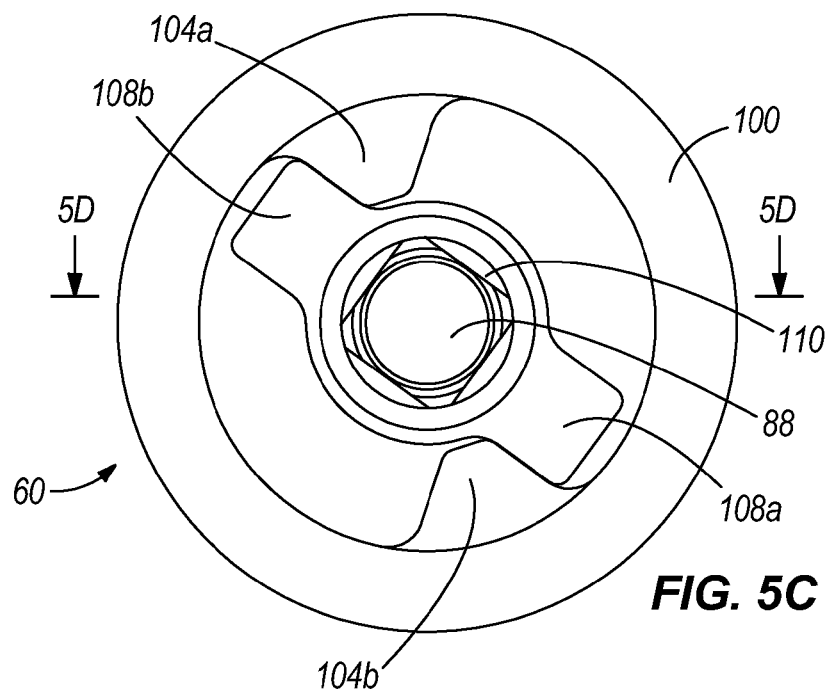
Figure 5D:
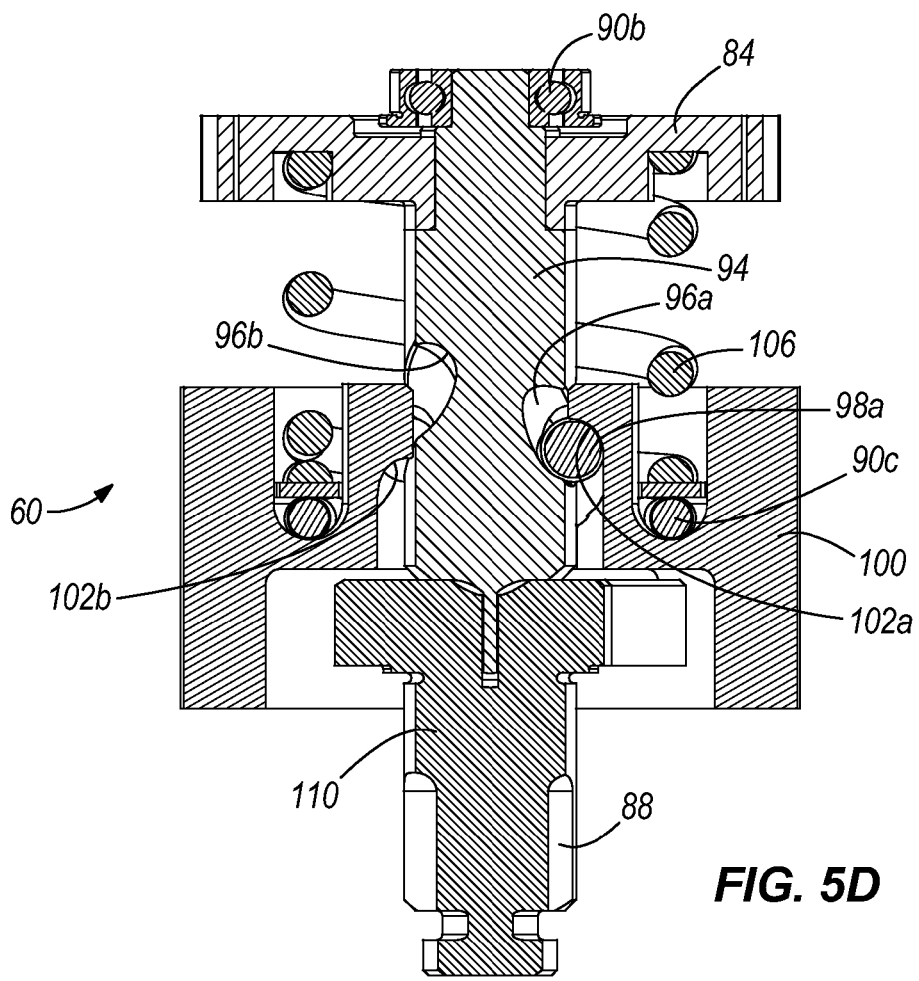
Figure 5E:
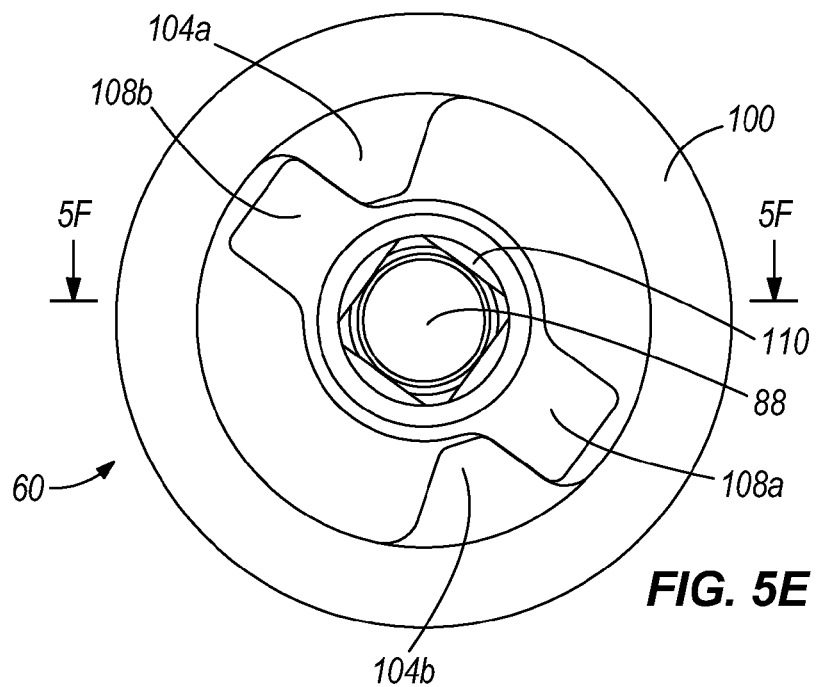
Figure 5F:
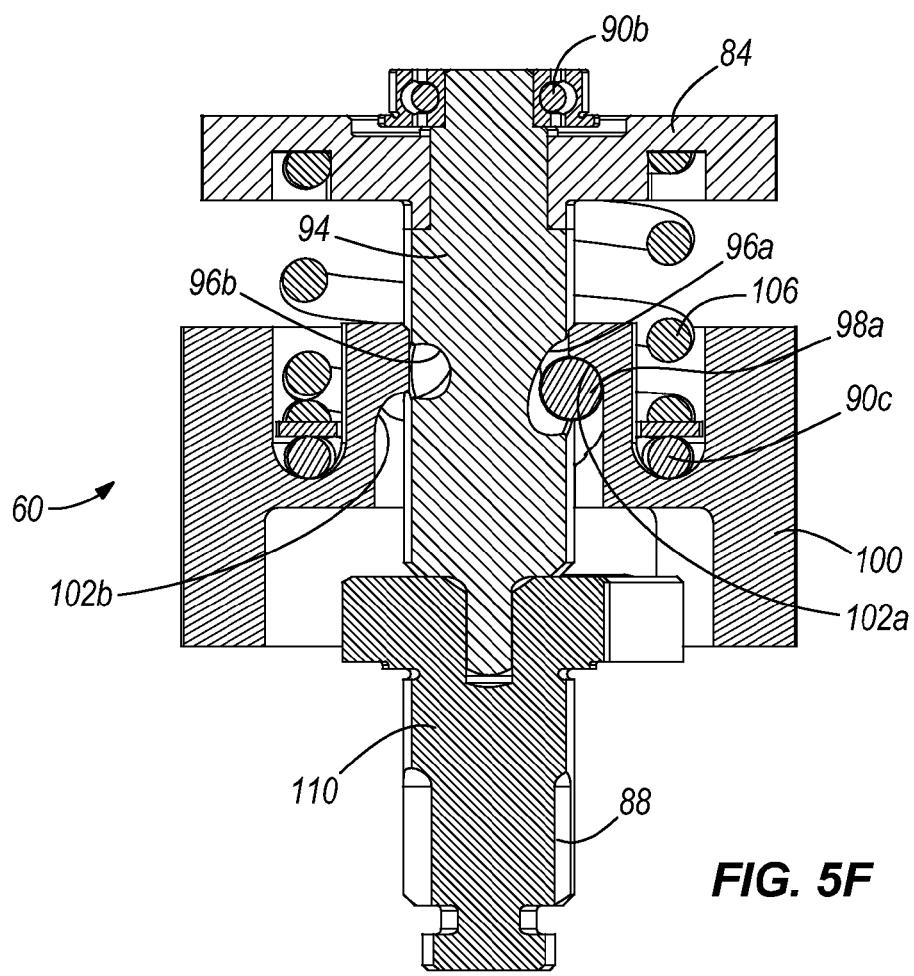
Figure 5G:
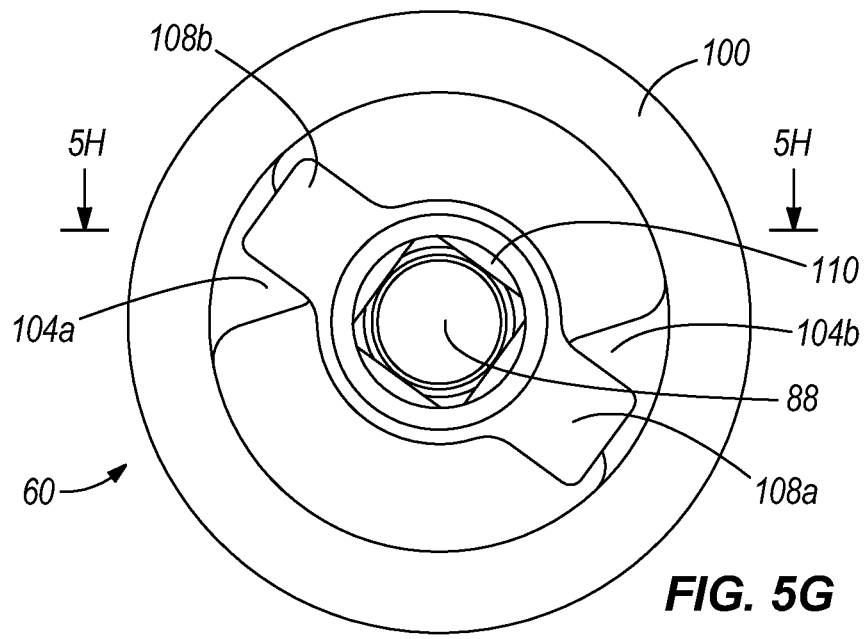
Figure 5H:
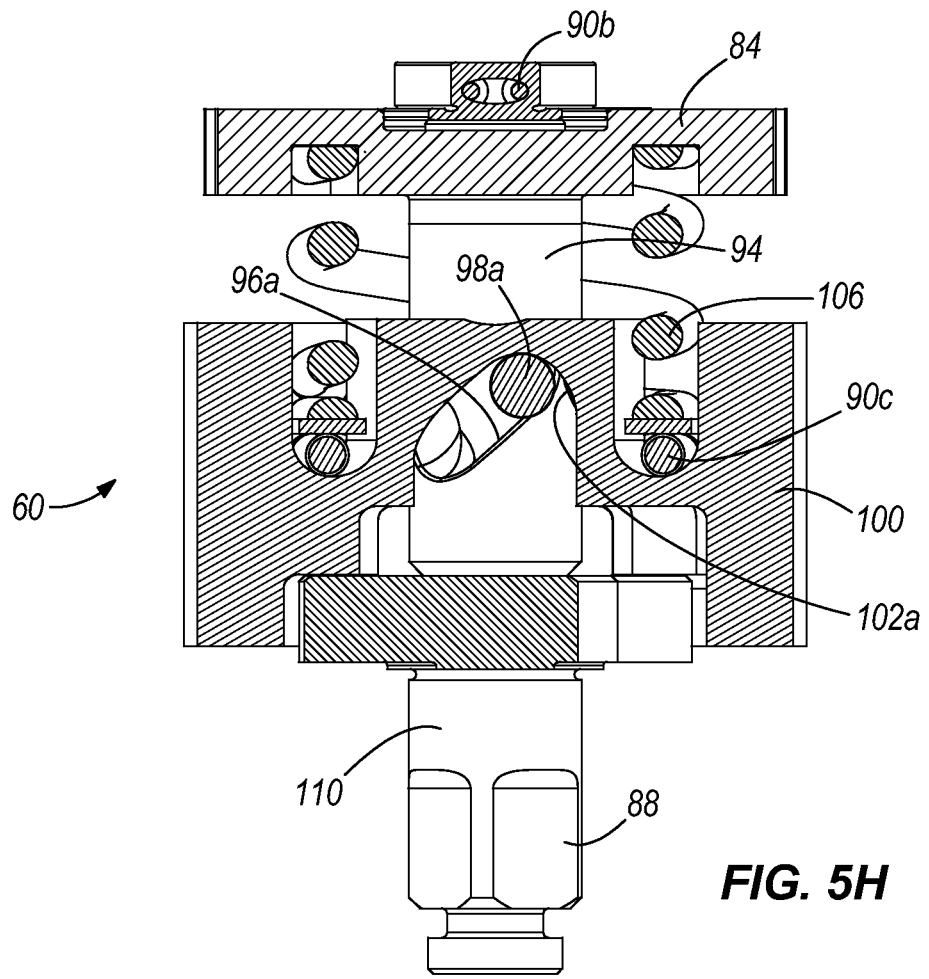
Figure 5I:
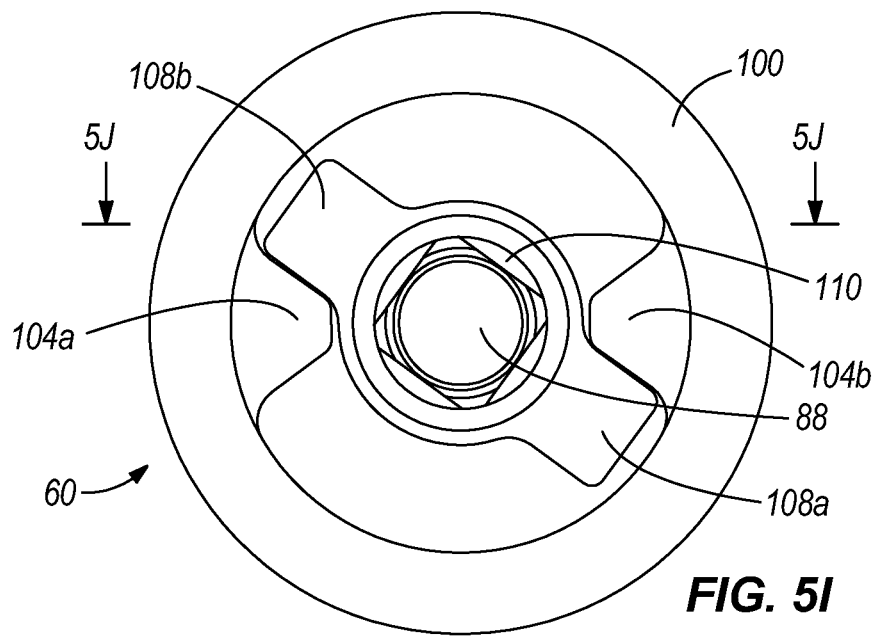
Figure 5J:
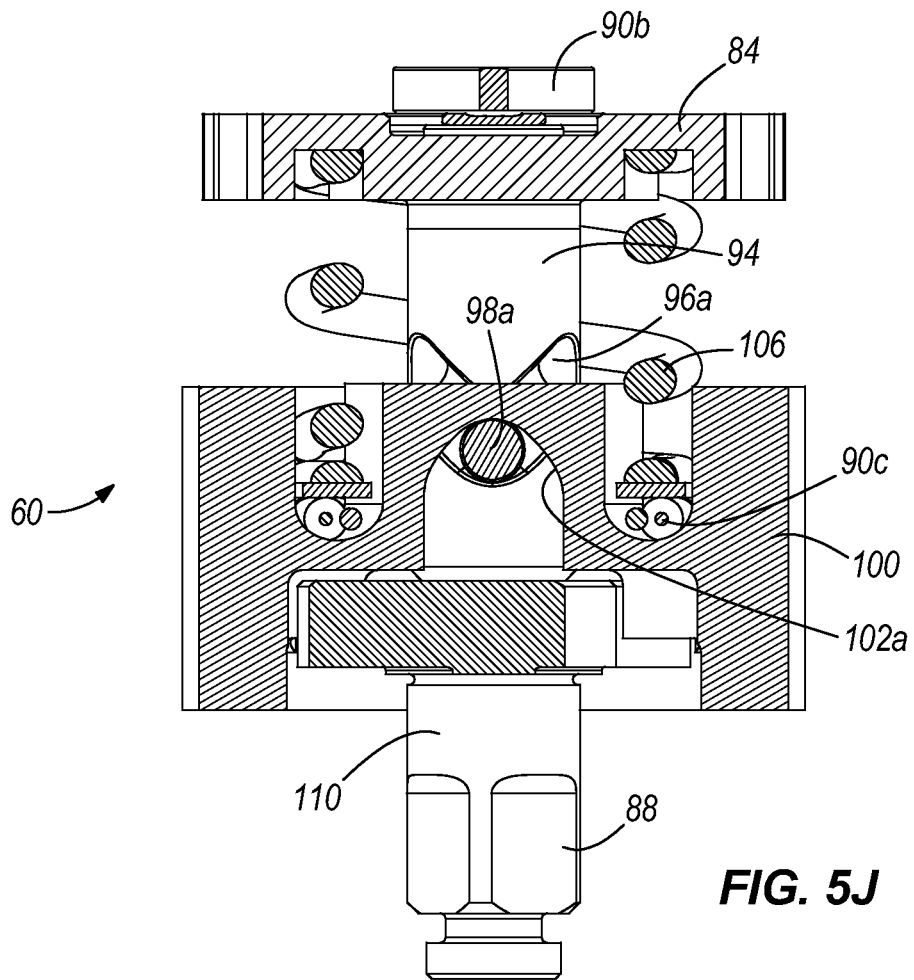

The illustrated work attachment 14 houses a gear assembly 58 and an impact mechanism 60. In the illustrative embodiment of FIGS. 1-4, the gear assembly 58 includes a bevel gear set comprising a bevel gear 62 and a bevel gear 66. The bevel gear 62 is coupled to the rotor 40 for rotation with the rotor 40 about the longitudinal handle axis 42. A bearing 64 is positioned between the bevel gear 62 and the motor bracket 20. The bevel gear 66 meshes with the bevel gear 62. The bevel gear 66 is coupled to a shaft 68 for rotation with the shaft 68 about an axis 74 (FIG. 4). The shaft 68 is supported in the work attachment 14 by bearings 70a, 70b. The shaft 68 includes a splined portion 72 near bearing 70b. The splined portion 72 functions as a spur gear and, in some embodiments, can be replaced with a spur gear.

In the illustrative embodiment of FIGS. 1-4, the gear assembly 58 also includes a spur gear set comprising the splined portion 72 of shaft 68, an idler spur gear 76, and a drive spur gear 84. Rotation of the splined portion 72 of shaft 68 causes rotation of the idler spur gear 76 about an axis 78 (FIG. 4). The idler spur gear 76 is coupled to a shaft 80 for rotation with the shaft 80 about the axis 78. The shaft 80 is supported with respect to the work attachment 14 by bearings 82a, 82b.

The idler spur gear 76 meshes with a drive spur gear 84 to cause rotation of the drive spur gear 84 about an axis 86 (FIG. 4). The drive spur gear 84 is coupled to an output drive 88 through the impact mechanism 60 for selectively rotating the output drive 88. The drive spur gear 84 and the output drive 88 are supported for rotation within the angle housing 46 by bearings 90a, 90b, 90c. The output drive 88 is illustratively embodied as a square drive that may be connected to a socket or other fastener-driving output element.

In the illustrative embodiment of FIGS. 1-4, the axes 74, 78, and 86 are all substantially parallel to each other and are all substantially perpendicular to axis 42. It is contemplated that, in other embodiments, one or more of the axes 74, 78, and 86 may be oriented at another angle that is non-parallel to axis 42.

The impact mechanism 60 may be embodied as any type of impact mechanism. In the illustrative embodiment of FIGS. 1-4, the impact mechanism 60 is a ball-and-cam-type impact mechanism. The impact mechanism 60 includes a cam shaft 94 coupled to the drive spur gear 84 for rotation with the drive spur gear 84 about the axis 86. The illustrated cam shaft 94 includes opposite cam grooves 96a, 96b that define pathways for respective balls 98a, 98b. The illustrated impact mechanism 60 further includes a hammer 100 that includes opposite cam grooves 102a, 102b that are substantially mirror-images of cam grooves 96a, 96b. The balls 98a, 98b are retained between the respective cam grooves 96a, 96b, 102a, 102b. The hammer 100 also includes hammer jaws 104a, 104b.

The motor 16 drives the gear assembly 58 and the impact mechanism 60 to drive rotation of the output drive 88, as shown in the illustrated embodiment. The output drive 88 is rotated about the axis 86, which is non-parallel to the axis 42. In the illustrative embodiment of FIGS. 1-4, the axis 86 is perpendicular to the axis 42. In other embodiments (not shown), the axis 86 may be at any acute or obtuse angle to the axis 42.

In the illustrative embodiment of FIGS. 1-4, a cylindrical spring 106 is positioned between the drive spur gear 84 and the hammer 100 to bias the hammer 100 away from the drive spur gear 84. The spring 106 surrounds a portion of the cam shaft 94. In the illustrated embodiment, the spring 106 rotates with the drive spur gear 84 and the bearing 90c permits the hammer 100 to rotate with respect to the spring 106. Other configurations are possible, and the illustrated configuration is given by way of example only.

The illustrated output drive 88 is integrally formed with anvil jaws 108a, 108b to create an anvil 110 of the impact mechanism 60. In other embodiments, the output drive 88 may be coupled to the anvil 110. The anvil 110 is supported for rotation within the angle housing 46 by the bearing 90a. The hammer jaws 104a, 104b impact the anvil jaws 108a, 108b to drive the output drive 88 in response to rotation of the drive spur gear 84. In particular, the hammer jaws 104a, 104b rotate to periodically deliver an impact load to the anvil jaws 108a, 108b and, thereby, cause intermittent rotation of the output drive 88.

In the illustrative embodiment of FIGS. 1-4, the impact cycle of the impact mechanism 60 is repeated twice every rotation and is illustrated in FIGS. 5A-5J. The spring 106 permits the hammer 100 to rebound after impact, and balls 98a, 98b guide the hammer 100 to ride up around the cam shaft 94, such that hammer jaws 104a, 104b are spaced axially from the anvil jaws 108a, 108b. The hammer jaws 104a, 104b are permitted to rotate past the anvil jaws 108a, 108b after the rebound. FIGS. 5A-5J illustrate one impact cycle of the impact mechanism 60 of FIGS. 1-4. Two such impact cycles occur per rotation of the hammer 100. It will be appreciated that the impact cycle illustrated in FIGS. 5A-5J is exemplary in nature and that, in other embodiments, impact mechanisms with different impact cycles may be used.

Figure 6:
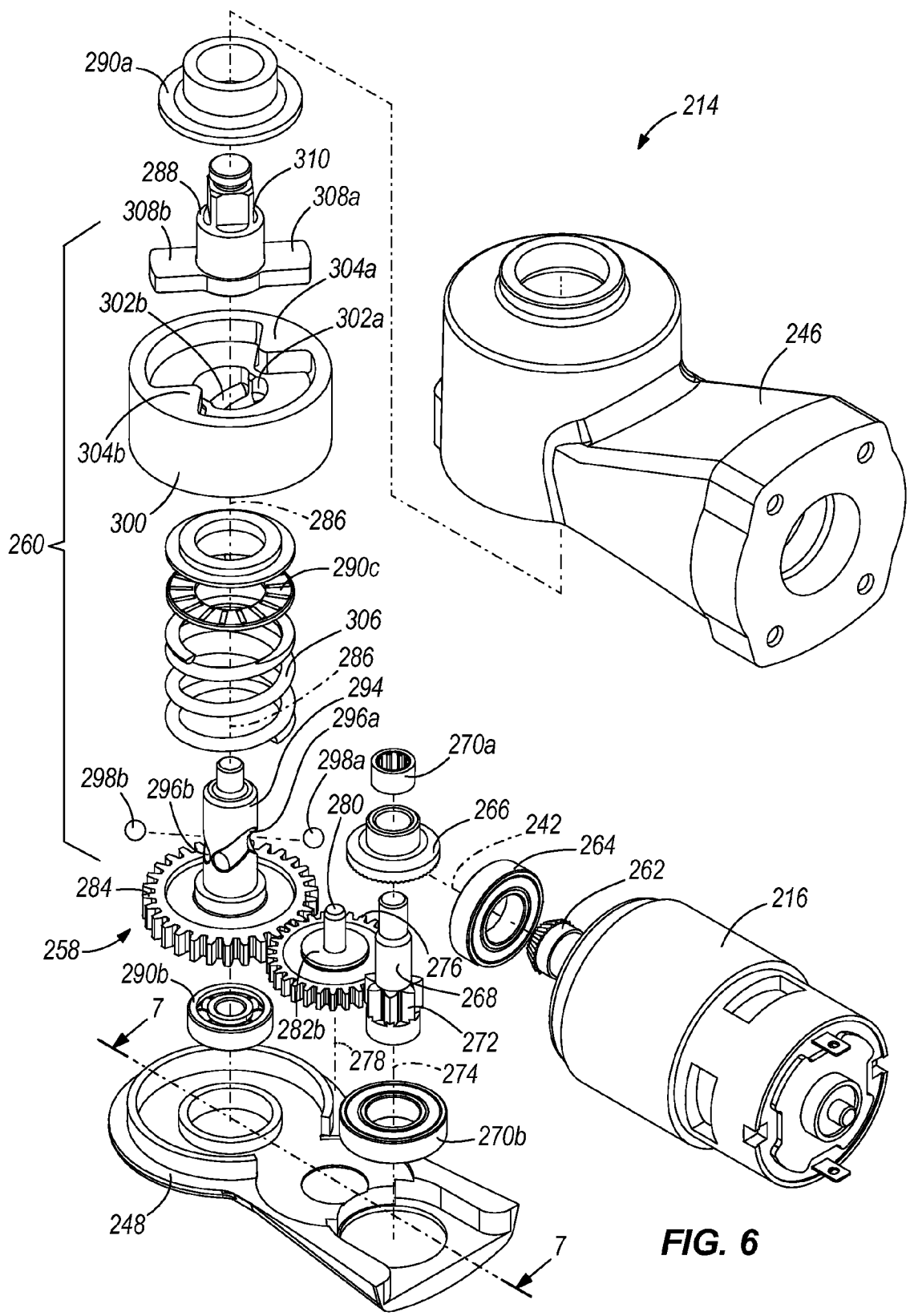
FIG. 6 is an exploded view of another illustrative embodiment of an angle head of an angle impact tool.
Figure 7:
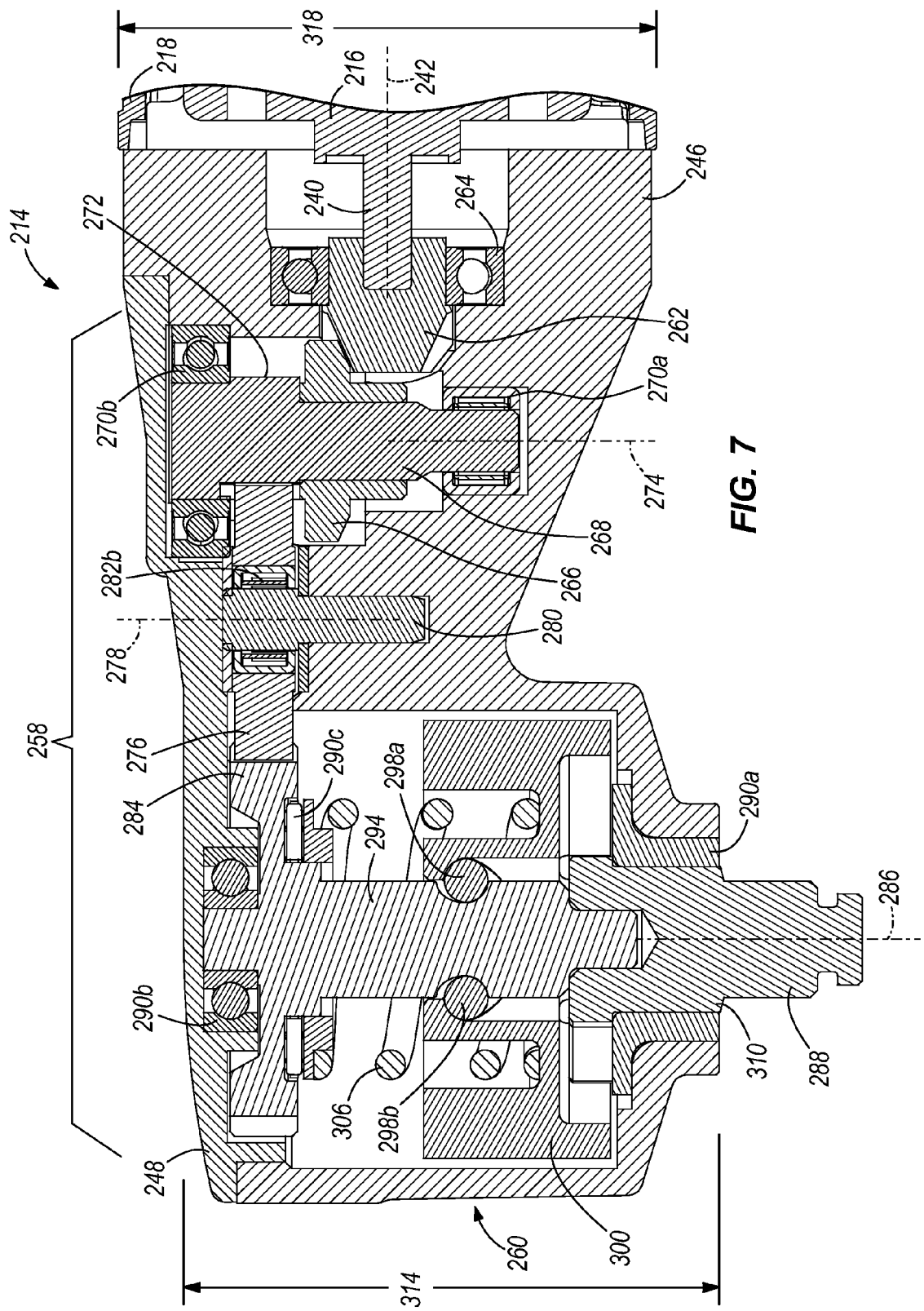
FIG. 7 is a cross-sectional view taken along line 7-7 of FIG. 6.

FIGS. 6 and 7 illustrate another illustrative embodiment of an angle head work attachment 214 for an angle impact tool. The angle head work attachment 214 may be coupled to a handle and a motor 216 having a rotor 240 (i.e., an output shaft). The motor 216 may be supported by a motor housing 218. The illustrated motor 216 is an electric motor, but any suitable prime mover, such as the pneumatic motor disclosed in U.S. Pat. No. 7,886,840, may be utilized. Although not specifically illustrated, a battery and a directional reverse switch may be provided on the angle impact tool, in some embodiments.

The angle head work attachment 214 includes an angle housing 246 and an angle housing plate 248 that support a gear assembly 258 and an impact mechanism 260. The rotor 240 rotates about a longitudinal handle axis 242. In the illustrative embodiment of FIGS. 6 and 7, the gear assembly 258 includes a bevel gear set comprising a bevel gear 262 and a bevel gear 266. The bevel gear 262 is coupled to the rotor 240 for rotation with the rotor 240 about the longitudinal handle axis 242. A bearing 264 is positioned between the bevel gear 262 and the motor housing 218. The bevel gear 266 meshes with bevel gear 262. The bevel gear 266 is coupled to a shaft 268 for rotation with the shaft 268. The shaft 268 is supported in the work attachment 214 by bearings 270a, 270b. The shaft 268 includes a splined portion 272 near bearing 270b. The shaft 268 rotates about an axis 274. The splined portion 272 functions as a spur gear and, in some embodiments, can be replaced with a spur gear.

In the illustrative embodiment of FIGS. 6 and 7, the gear assembly 258 also includes a spur gear set comprising the splined portion 272 of shaft 268, an idler spur gear 276, and a drive spur gear 284. Rotation of the splined portion 272 of shaft 268 causes rotation of the idler spur gear 276 about an axis 278. The idler spur gear 276 is coupled to a shaft 280 for rotation with the shaft 280 about the axis 278. The shaft 280 is supported with respect to the work attachment 214 by bearings 282a, 282b.

The idler spur gear 276 meshes with a drive spur gear 284 to cause rotation of the drive spur gear 284 about an axis 286. The drive spur gear 284 is coupled to an output drive 288 through the impact mechanism 260 for selectively rotating the output drive 288. The drive spur gear 284 and the output drive 288 are supported for rotation within the work attachment 214 by bushing 290a and bearings 290b, 290c. The output drive 288 is illustratively embodied as a square drive that may be connected to a socket or other fastener-driving output element.

In the illustrative embodiment of FIGS. 6 and 7, the axes 274, 278, and 286 are all substantially parallel to each other and are all substantially perpendicular to axis 242. It is contemplated that, in other embodiments, one or more of the axes 274, 278, and 286 may be oriented at another angle that is non-parallel to axis 242.

The impact mechanism 260 may be embodied as any type of impact mechanism. In the illustrative embodiment of FIGS. 6 and 7, the impact mechanism 260 is a ball-and-cam-type impact mechanism. The impact mechanism 260 includes a cam shaft 294 coupled to the drive spur gear 284 for rotation with the drive spur gear 284 about the axis 286. The illustrated cam shaft 294 includes opposite cam grooves 296a, 296b that define pathways for respective balls 298a, 298b. The illustrated impact mechanism 260 further includes a hammer 300 that includes opposite cam grooves 302a, 302b that are substantially mirror-images of cam grooves 296a, 296b. The balls 298a, 298b are retained between the respective cam grooves 296a, 296b, 302a, 302b. The hammer 300 also includes hammer jaws 304a, 304b.

The motor 216 drives the gear assembly 258 and the impact mechanism 260 to drive rotation of the output drive 288, as shown in the illustrated embodiment. The output drive 288 is rotated about the axis 286, which is non-parallel to the axis 242. In the illustrative embodiment of FIGS. 6 and 7, the axis 286 is perpendicular to the axis 242. In other embodiments (not shown), the axis 286 may be at any acute or obtuse angle to the axis 242.

In the illustrative embodiment of FIGS. 6 and 7, a cylindrical spring 306 is positioned between the drive spur gear 284 and the hammer 300 to bias the hammer 300 away from the drive spur gear 284. The spring 306 surrounds a portion of the cam shaft 294. In the illustrated embodiment, the spring 306 rotates with the drive spur gear 284, and the bearing 290c permits the hammer 300 to rotate with respect to the spring 306. Other configurations are possible, and the illustrated configuration is given by way of example only.

The illustrated output drive 288 is integrally formed with anvil jaws 308a, 308b to create an anvil 310 of the impact mechanism 260. In other embodiments, the output drive 288 may be coupled to the anvil 310. The anvil 310 is supported for rotation within the angle housing 246 by the bushing 290a. The hammer jaws 304a, 304b impact the anvil jaws 308a, 308b to drive the output drive 288 in response to rotation of the drive spur gear 284. In particular, the hammer jaws 304a, 304b rotate to periodically deliver an impact load to the anvil jaws 308a, 308b and, thereby, cause intermittent rotation of the output drive 288. The impact cycle of the impact mechanism 260 is repeated twice every rotation and is similar to the impact cycle illustrated in FIGS. 5A-5J. It will be appreciated that the impact cycle illustrated in FIGS. 5A-5J is exemplary in nature and that, in other embodiments, impact mechanisms with different impact cycles may be used.

Figure 8:
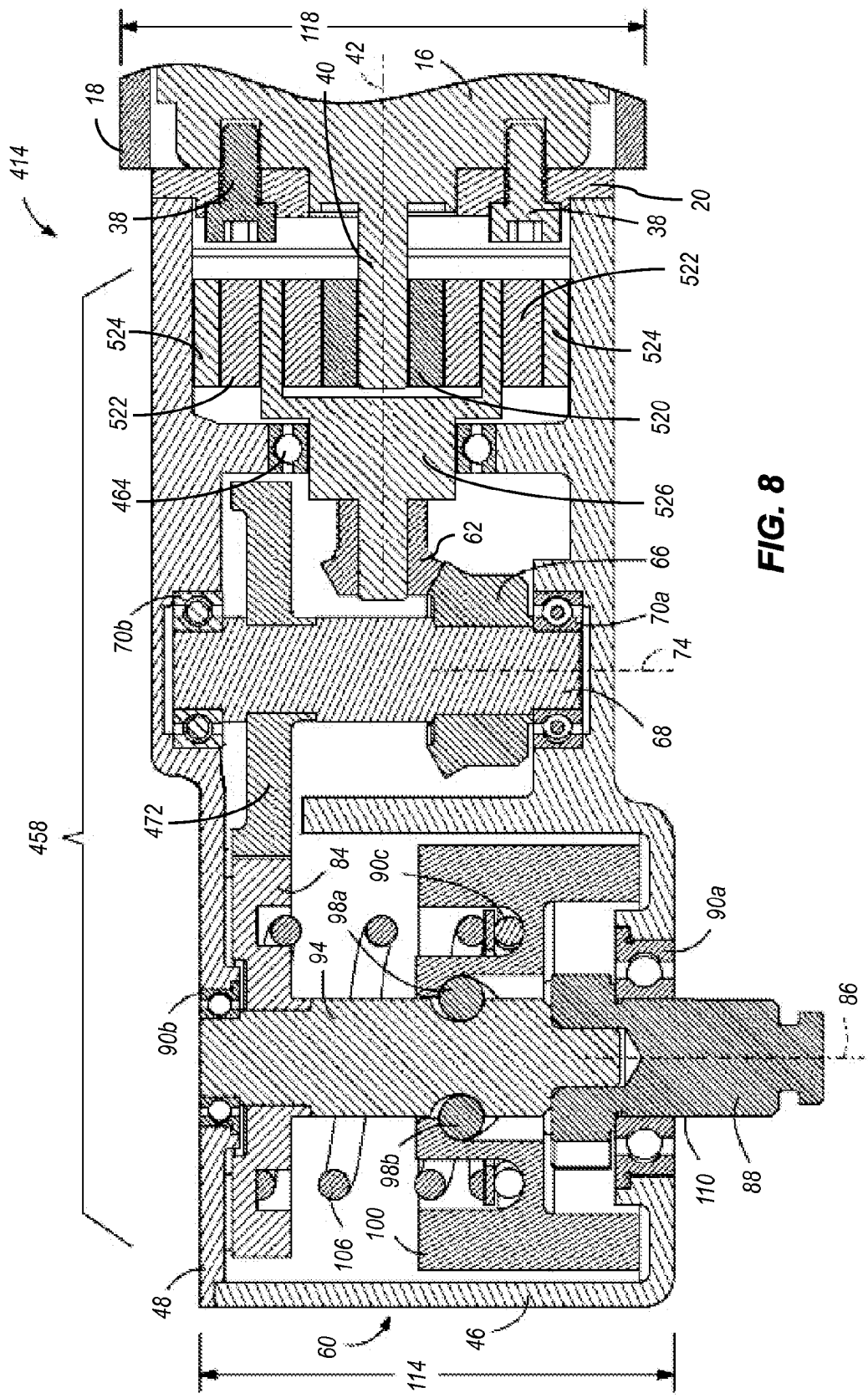
FIG. 8 is a cross-sectional view of another illustrative embodiment of an angle head of an angle impact tool.

FIG. 8 illustrates another illustrative embodiment of a work attachment 414 for an angle impact tool. Except as described below, the work attachment 414 may have a similar configuration to the work attachment 14 described above with reference to FIGS. 1-4. While the work attachment 414 is illustrated in FIG. 8 as a modified embodiment of the work attachment 14, it will be appreciated that the modified features of work attachment 414 might also be applied to the work attachment 214 of FIGS. 6 and 7 and/or to other angle impact tools.

As shown in FIG. 8, a gear assembly 458 of the work attachment 414 includes a bevel gear set and a spur gear set, which may be similar to those of gear assembly 58 (described above with reference to FIGS. 1-4). The gear assembly 458 further includes a planetary gear set positioned between the output shaft 40 of the motor 16 and the bevel gear set. In the illustrative embodiment of FIG. 8, the planetary gear set comprises a central gear 520 (sometimes referred to as a sun gear) and a number of planet gears 522 arranged within a ring gear 524. The planetary gear set also comprises a planet carrier 526 coupled to each of the planet gears 522. It is contemplated that, in other embodiments, the planetary gear set of the gear assembly 458 may have other configurations.

In the illustrative embodiment of FIG. 8, the central gear 520 is coupled to the output shaft 40 of the motor 16. Each planet gear 522 meshes with the central gear 520, as well as with the ring gear 524. The ring gear 524 is fixed relative to the angle housing 46. As such, when the central gear 520 is driven by the output shaft 40 of the motor 16, the planet gears 522 each rotate and travel about the central gear 520. Travel of the planet gears 522 causes rotation of the planet carrier 526. The planet carrier 526 is coupled to the bevel gear 62, such that rotation of the planet carrier 526 drives rotation of the bevel gear 62 (and, thus, the bevel gear set of the gear assembly 458).

By using a planetary gear set, the remainder of the gear assembly 458 may be simplified (e.g., as compared to the gear assembly 58, described above). The planetary gear set of the gear assembly 458 can be used to perform speed reduction from the output shaft 40 of the motor 16, while utilizing lower cost and/or lower stress gears. By way of example, inclusion of a planetary gear set in the gear assembly 458 may allow use of a spur gear set that does not include an idler gear. In other words, the idler spur gear 76 of gear assembly 58 described above (with reference to FIGS. 1-4) may be eliminated from the spur gear set of the gear assembly 458. In the illustrative embodiment of FIG. 8, the spur gear set of gear assembly 458 includes only the spur gear 472 and the drive spur gear 84. As shown in FIG. 8, the spur gear 472 meshes with the drive spur gear 84. It is contemplated that, in some embodiments, the spur gear 472 and the bevel gear 66 may be integrally formed as a single gear. In such embodiments, this single gear would be part of both the spur gear set and the bevel gear set.

Figure 9:
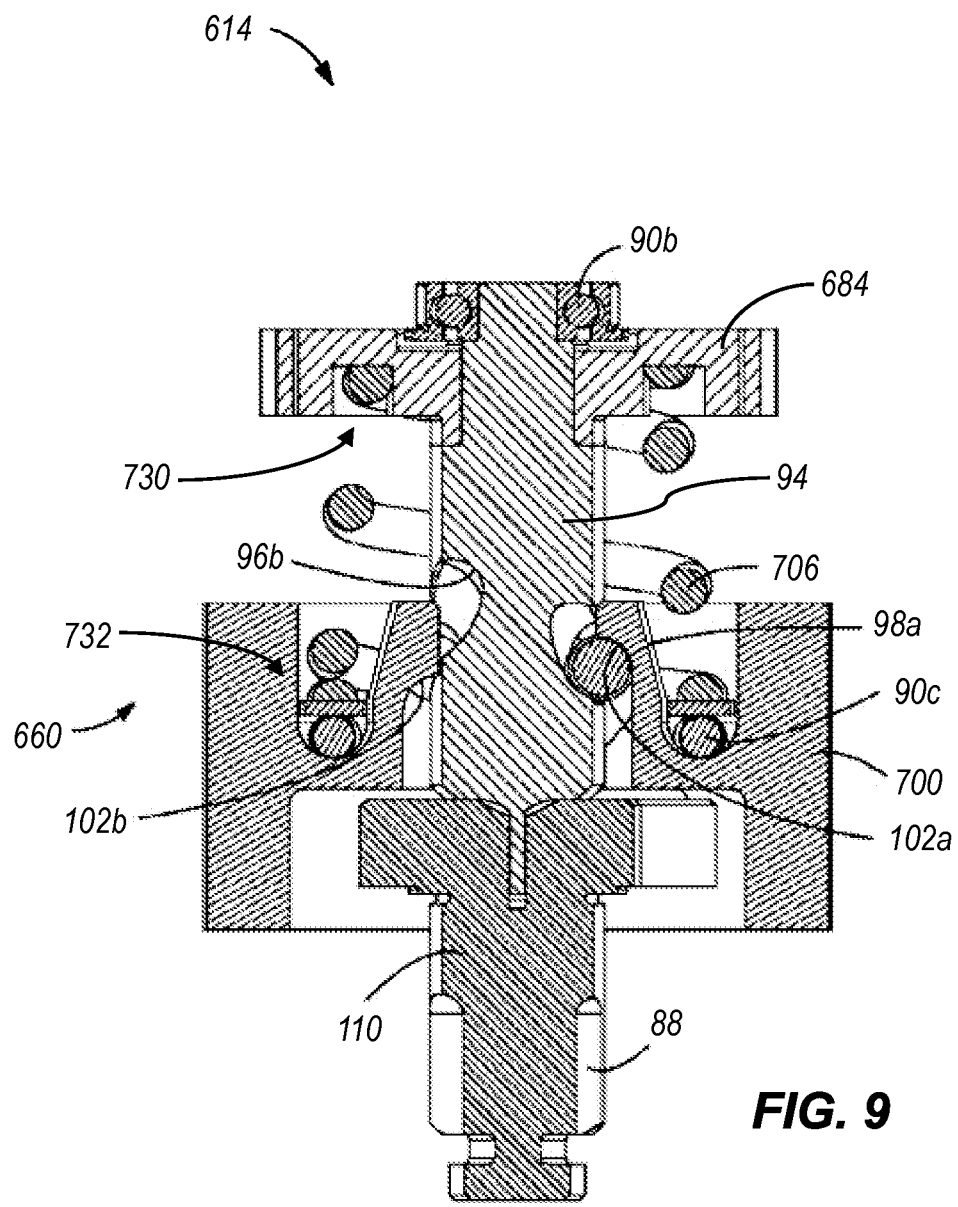
FIG. 9 is a cross-sectional view of another illustrative embodiment of a portion of an angle head for an angle impact tool.

FIG. 9 illustrates a portion of another illustrative embodiment of a work attachment 614 for an angle impact tool. Except as described below, the work attachment 614 may have a similar configuration to the work attachment 14 described above with reference to FIGS. 1-4. While a portion of the work attachment 614 is illustrated in FIG. 9 as a modified embodiment of the work attachment 14, it will be appreciated that the modified features of work attachment 614 might also be applied to the work attachment 214 of FIGS. 6 and 7, the work attachment 414 of FIG. 8, and/or to other angle impact tools.

The work attachment 614 includes a drive spur gear 684 and an impact mechanism 660, which may be generally similar to the drive spur gear 84 and the impact mechanism 60 described above with reference to FIGS. 1-4. As illustrated in FIG. 9, the work attachment 614 includes a conical spring 706 positioned between the drive spur gear 684 and a hammer 700 of the impact mechanism 660 (rather than the cylindrical spring 106 positioned between the drive spur gear 84 and the hammer 100 of the impact mechanism 60). The conical spring 706 biases the hammer 700 away from the drive spur gear 684. The conical spring 706 surrounds a portion of the cam shaft 94.

As shown in FIG. 9, the conical spring 706 has a generally conical (or frusto-conical) cross-section. In other words, one end of the conical spring 706 is wider, or has a larger diameter, than the opposite end of the conical spring 706. In the illustrative embodiment, a first end 730 of the conical spring 706 that is coupled to the drive spur gear 684 has a smaller diameter than a second end 732 of the conical spring that is coupled to the hammer 700. It is contemplated that, in other embodiments, the first end 730 of the conical spring 706 may have a larger diameter than the second end 732 of the conical spring 706. In the illustrated embodiment, the conical spring 706 rotates with the drive spur gear 684 and the bearing 90c permits the hammer 700 to rotate with respect to the conical spring 706. In other embodiments, the conical spring 706 may rotate with the hammer 700 and a bearing may permit the drive spur gear 684 to rotate with respect to the conical spring 706.

It is believed that the conical spring 706 may provide several advantages over the cylindrical spring 106. For instance, the conical spring 706 may have a longer service life than the cylindrical spring 106. The conical spring 706 may also have a smaller solid height than the cylindrical spring 106, while maintaining similar performance. Decreasing the solid height of the conical spring 706 may allow for a decrease in the overall height of the work attachment 614. In the illustrative embodiment of FIG. 9, the smaller diameter of the first end 730 of the conical spring 706 may also allow the drive spur gear 684 to have a smaller diameter, further decreasing the dimensions of the work attachment 614.

Head height dimensions 114, 314 of the work attachments 14, 214, 414 are illustrated in FIGS. 4, 7, and 8. The head height dimension 114 is the axial distance from the top of the angle housing plate 48 to the bottom of the angle housing 46 (for both works attachments 14, 414), while the head height dimension 314 is the axial distance from the top of the angle housing 246 to the bottom of the angle housing 246. It may be desirable to reduce the head height dimensions so that the work attachments 14, 214, 414 can fit into small spaces. The motor housings 18, 218 define motor housing height dimensions 118, 318 as shown in FIGS. 4, 7, and 8. The illustrative embodiments of the present disclosure allow the head height dimensions 114, 314 to be equal to or smaller than the motor housing height dimensions 118, 318. Such configurations permit insertion of the angle impact tool into smaller spaces than has previously been achievable, without compromising torque.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. An angle impact tool comprising:
a motor including an output shaft configured to rotate about a first axis;
an impact mechanism configured to drive rotation of an output drive about a second axis that is non-parallel to the first axis; and
a gear assembly configured to be driven by the output shaft of the motor and to drive the impact mechanism, the gear assembly comprising (i) a planetary gear set coupled to the output shaft of the motor, (ii) a bevel gear set coupled to the planetary gear set, the bevel gear set configured to be driven by the planetary gear set, and (iii) a spur gear set coupled to the bevel gear set and to the impact mechanism, the spur gear set configured to be driven by the bevel gear set and to drive the impact mechanism;
wherein the bevel gear set comprises a first bevel gear and a second bevel gear that meshes with the first bevel gear, the first bevel gear being configured to rotate about the first axis and the second bevel gear being configured to rotate about a third axis that is parallel to and spaced apart from the second axis.

2. The angle impact tool of claim 1, wherein the second axis is perpendicular to the first axis.

3. The angle impact tool of claim 1, wherein the spur gear set does not include an idler gear.

4. The angle impact tool of claim 1, wherein the spur gear set includes only two gears.

5. The angle impact tool of claim 1, wherein the impact mechanism comprises a ball-and-cam-type impact mechanism.

6. The angle impact tool of claim 1, wherein the motor is an electric motor.

7. The angle impact tool of claim 6, further comprising a battery configured to supply electrical power to the electric motor.

8. The angle impact tool of claim 1, wherein the spur gear set comprises:
a first spur gear configured to rotate about the third axis; and
a second spur gear configured to rotate about the second axis.

9. The angle impact tool of claim 8, wherein the first spur gear meshes with the second spur gear.

10. The angle impact tool of claim 8, wherein the second bevel gear and the first spur gear are integrally formed as a single gear.

11. The angle impact tool of claim 1, wherein the impact mechanism comprises:
an anvil configured to rotate about the second axis; and
a hammer configured to rotate about the second axis to periodically deliver an impact load to the anvil.

12. The angle impact tool of claim 11, wherein the output drive is coupled to the anvil of the impact mechanism.

13. The angle impact tool of claim 11, wherein the output drive is integrally formed with the anvil of the impact mechanism.

14. The angle impact tool of claim 11, wherein the spur gear set of the gear assembly comprises a drive gear coupled to the hammer of the impact mechanism.

15. The angle impact tool of claim 14, further comprising a conical spring positioned between the hammer and the drive gear, the conical spring biasing the hammer away from the drive gear.

16. The angle impact tool of claim 15, wherein the conical spring has a first end coupled to the drive gear and a second end coupled to the hammer, the first end having a first diameter and the second end having a second diameter that is greater than the first diameter.

17. An angle impact tool comprising:
   a motor including an output shaft configured to rotate about a first axis;
   an impact mechanism configured to drive rotation of an output drive about a second axis that is non-parallel to the first axis; and
   a gear assembly configured to be driven by the output shaft of the motor and to drive the impact mechanism, the gear assembly comprising (i) a planetary gear set coupled to the output shaft of the motor, (ii) a bevel gear set coupled to the planetary gear set, the bevel gear set configured to be driven by the planetary gear set, and (iii) a spur gear set coupled to the bevel gear set and to the impact mechanism, the spur gear set configured to be driven by the bevel gear set and to drive the impact mechanism, wherein the spur gear set includes only two gears.

18. The angle impact tool of claim 17, wherein the second axis is perpendicular to the first axis.

19. The angle impact tool of claim 17, wherein:
   the bevel gear set comprises a first bevel gear and a second bevel gear that meshes with the first bevel gear, the first bevel gear being configured to rotate about the first axis and the second bevel gear being configured to rotate about a third axis that is parallel to and spaced apart from the second axis; and
   the spur gear set consists of a first spur gear configured to rotate about the third axis and a second spur gear configured to rotate about the second axis.

20. The angle impact tool of claim 19, wherein the second bevel gear and the first spur gear are integrally formed as a single gear.

\* \* \* \* \*